United States Patent
Wemple (10) Patent No.: US 6,719,105 B1
(45) Date of Patent: Apr. 13, 2004

(54) PAD RETRACTION SPRING FOR DISC BRAKE ASSEMBLY

(75) Inventor: Jonathan Wemple, Royal Oak, MI (US)

(73) Assignee: Kelsey-Hayes Company, Livonia, MI (US)

( * ) Notice: Subject to any disclaimer, the term of this patent is extended or adjusted under 35 U.S.C. 154(b) by 0 days.

(21) Appl. No.: 10/183,058

(22) Filed: Jun. 26, 2002

(51) Int. Cl.[7] ............................................. F16D 65/097
(52) U.S. Cl. ................ 188/73.38; 188/72.3; 188/72.39; 188/205 A
(58) Field of Search .................. 188/72.3, 216, 188/73.39, 73.35, 73.36, 73.37, 205 A, 73.38; 267/158–165

(56) References Cited

U.S. PATENT DOCUMENTS

| | | | |
|---|---|---|---|
| 5,251,727 A | * | 10/1993 | Loeffler et al. .......... 188/73.38 |
| 5,549,181 A | | 8/1996 | Evans |
| 6,378,665 B1 | | 4/2002 | McCormick et al. |

* cited by examiner

*Primary Examiner*—Douglas C. Butler
(74) *Attorney, Agent, or Firm*—MacMillan, Sobanki & Todd, LLC (57) ABSTRACT

This invention relates to an improved pad retraction spring (30) adapted for use in a disc brake assembly. The disc brake assembly includes an anchor bracket (12) adapted to be secured to a vehicle component, a brake caliper (108) adapted to be secured to the anchor bracket, a pair of brake shoes (18, 20) carried by the disc brake assembly and adapted to be disposed on opposite axial sides of an associated brake rotor (106), and an actuation device for selectively moving the brake shoes into frictional engagement with the rotor. The anchor bracket includes a pair of outwardly extending arms (14, 16) and at least one of the arms has an opening (60) formed therethrough. The pad retraction spring is carried by the disc brake assembly and is operative to move the brake shoes from engagement with the rotor when the brake shoes are in a non-braking position. The pad retraction spring includes a central mounting portion (32) and a pair of outermost spring arms (38, 38'). The central mounting portion extends through the opening of the arm and engages a portion of the anchor bracket to thereby secure and locate the pad retraction spring on the anchor bracket in a predetermined position. The outermost spring arms of the pad retraction spring engage a portion of the pair of brake shoes.

20 Claims, 6 Drawing Sheets

PAD RETRACTION SPRING FOR DISC BRAKE ASSEMBLY

BACKGROUND OF THE INVENTION

This invention relates in general to vehicle disc brake assemblies and in particular to an improved structure for a brake shoe retraction mechanism adapted for use in such a vehicle disc brake assembly.

Most vehicles are equipped with a brake system for retarding or stopping movement of the vehicle in a controlled manner. A typical brake system for an automobile or light truck includes a disc brake assembly for each of the front wheels and either a drum brake assembly or a disc brake assembly for each of the rear wheels. The brake assemblies are typically actuated by hydraulic or pneumatic pressure generated when an operator of the vehicle depresses a brake pedal. The structures of these drum brake assemblies and disc brake assemblies, as well as the actuators therefor are well known in the art.

Figure 18:
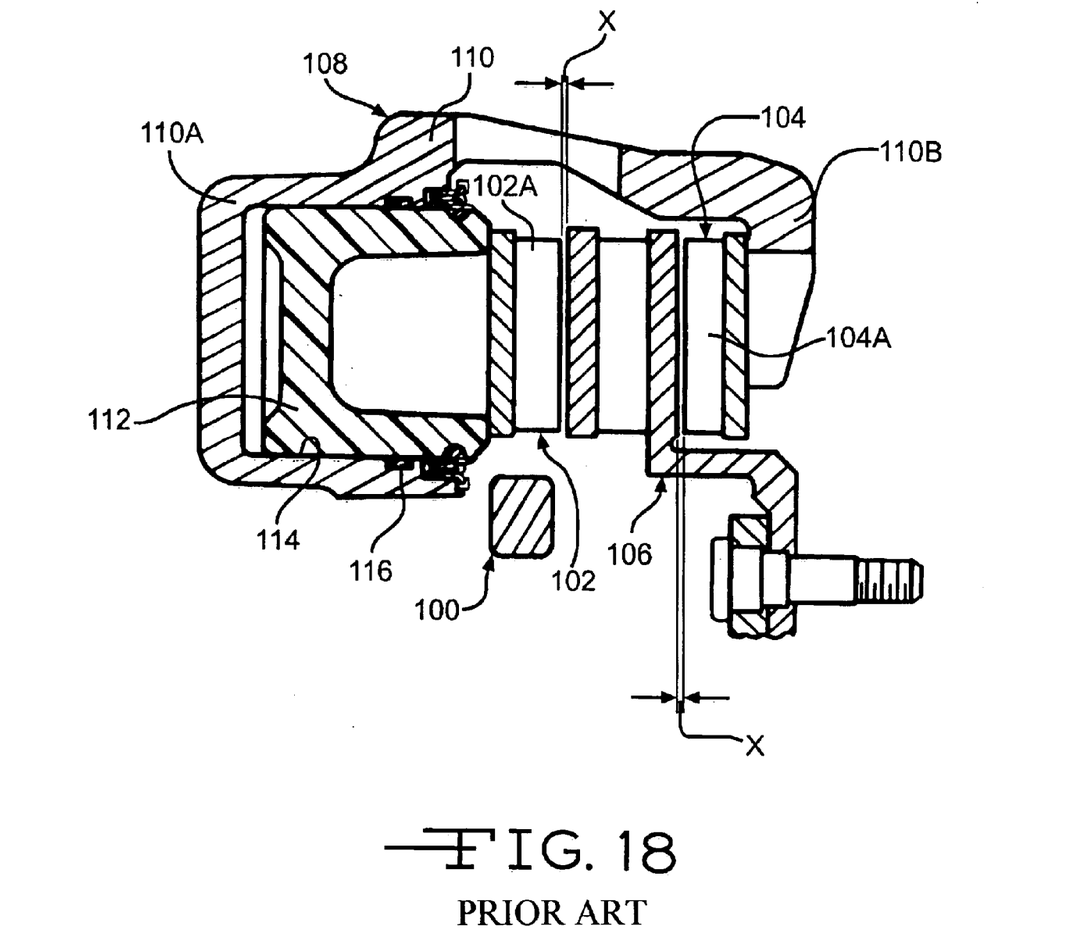
FIG. 18 is a sectional view of a portion of a prior art disc brake assembly.

A typical disc brake assembly is shown in prior art FIG. 18 and includes an anchor bracket 100 which is secured to a fixed, non-rotatable component of the vehicle. A pair of brake shoes 102 and 104 are supported on the anchor bracket for sliding movement relative thereto. The brake shoes have respective friction pads 102A and 104A which are disposed on opposite sides of a brake rotor 106. The rotor, in turn, is connected to the wheel of the vehicle for rotation therewith. To effect braking action, the brake shoes are moved inwardly toward one another so as to frictionally engage the opposed sides of the brake rotor. Such frictional engagement causes retarding or stopping of the rotational movement of the brake rotor and, therefore, the wheel of the vehicle in a controlled manner.

To accomplish this, the disc brake assembly further includes a caliper assembly, indicated generally at 108, for selectively moving the brake shoes into frictional engagement with the brake rotor. The caliper assembly typically includes guide pins or other components to slidably support a caliper housing 110 relative to the fixed anchor bracket. The caliper housing is generally C-shaped, having an inboard leg 110A disposed adjacent the inboard brake shoe and an outboard leg 110B disposed adjacent the outboard brake shoe. One or more hydraulically or pneumatically actuated brake pistons 112 are provided in respective cylindrical recesses 114 formed in the inboard leg of the caliper adjacent to the inboard brake shoe. When the brake pedal is depressed, the piston and the inboard leg of the caliper are urged apart from one another. Specifically, the piston is urged outwardly, while the outboard leg of the caliper is urged inwardly. As mentioned above, the piston is disposed adjacent to the inboard brake shoe and, therefore, urges it outwardly toward the inner side of the rotor. Because the caliper is slidably mounted on the pins of the anchor bracket, the outboard leg of the caliper (and, thus, the outboard brake shoe disposed adjacent thereto) are urged inwardly toward the outer side of the rotor. As result, the brake shoes frictionally engage the opposed sides of the rotor.

Frequently, an annular roll-back seal 116 is provided within the cylindrical recess in contact with the outer surface of the piston. The roll-back seal is conventional in the art and performs several functions. First, the roll-back seal provides a seal to define the extent of the cylindrical recess within which the piston is disposed. Second, the roll-back seal is designed to retract the piston inwardly away from the rotor by a predetermined distance from the fully engaged position when the brake pedal is released after being depressed. To accomplish this, the roll-back seal frictionally engages the outer surface of the piston, resiliently resisting movement thereof when the brake pedal is depressed. Thus, when the brake pedal is released by the operator of the vehicle, the resilience of the roll-back seal causes the piston to retract within the cylindrical recess and out of contact with the inboard brake shoe.

With repeated usage, the friction pads of the brake shoes wear and become increasingly thinner. When this occurs, the piston and the caliper must move greater distances relative to one another to effect the same braking action as when the friction pads were new. Despite this increased distance of movement of the piston in the outboard direction, it is desirable that the roll-back seal retract the piston only by the same predetermined distance away from the rotor in the inboard direction. Thus, known roll-back seals are designed to accommodate increased movement of the piston in the outboard direction when the brake pedal is depressed, but to retract the piston inwardly by approximately the same predetermined distance when the brake pedal is subsequently released.

Ideally, when the brake pedal is released, the brake shoes should also be spread apart from one another to prevent any incidental frictional engagement with the rotor. To accomplish this, it is known to provide the disc brake assembly with one or more retraction springs for moving the brake shoes apart from one another to prevent frictional engagement with the rotor when the brake pedal is released. For example, U.S. Pat. Nos. 4,364,455 to Oshima, 4,491,204 to Dirauf et al., U.S. Pat. No. 4,629,037 to Madzgalla et al., U.S. Pat. No. 4,658,938 to Thiel et al, U.S. Pat. No. 4,867,280 to Von Gruenberg et al., U.S. Pat. No. 4,940,119 to Kondo et al., U.S. Pat. No. 5,069,313 to Kato et al., U.S. Pat. No. 5,249,647 to Kobayashi et al., U.S. Pat. No. 5,251,727 to Loeffler et al., and U.S. Pat. No. 6,378,665 to McCormick et al. all disclose disc brake assemblies which include a retraction spring structure. It is desirable that such retraction springs exert an amount of force which is large enough to urge the brake shoes apart from one another to prevent engagement with the rotor, but small enough not to overcome the roll-back seal to move the piston deeper within the associated cylindrical recess formed in the inboard leg of the caliper.

SUMMARY OF THE INVENTION

This invention relates to an improved pad retraction spring adapted for use in a disc brake assembly. The disc brake assembly includes an anchor bracket adapted to be secured to a vehicle component, a brake caliper adapted to be secured to the anchor bracket, a pair of brake shoes carried by the disc brake assembly and adapted to be disposed on opposite axial sides of an associated brake rotor, and actuation means for selectively moving the brake shoes into frictional engagement with the rotor. The anchor bracket includes a pair of outwardly extending arms and at least one of the arms has an opening formed therethrough. The pad retraction spring is carried by the disc brake assembly and is operative to move the brake shoes from engagement with the rotor when the brake shoes are in a non-braking position. The pad retraction spring includes a central mounting portion and a pair of outermost spring arms. The central mounting portion extends through the opening of the arm and engages a portion of the anchor bracket to thereby secure and locate the pad retraction spring on the anchor bracket in a predetermined position. The outermost spring arms of the pad retraction spring engage a portion of the pair of brake shoes.

Other advantages of this invention will become apparent to those skilled in the art from the following detailed description of the preferred embodiments, when read in light of the accompanying drawings.

DETAILED DESCRIPTION OF THE PREFERRED EMBODIMENTS

Figure 1:
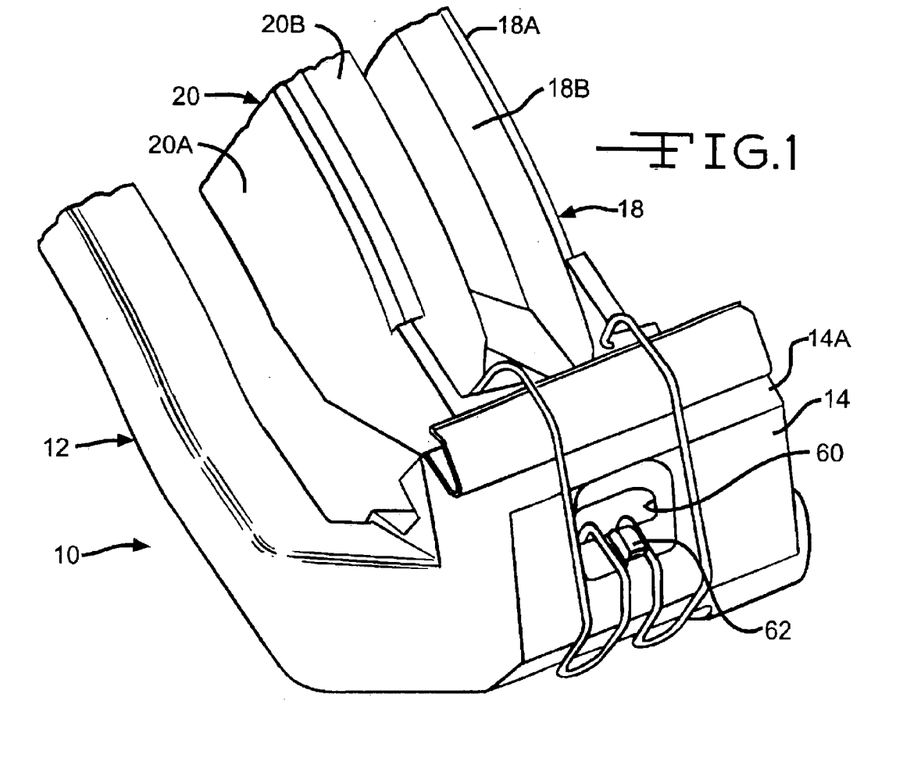
FIG. 1 is a perspective view of a portion of a first embodiment of a vehicle disc brake assembly including a pad retraction spring in accordance with this invention.

Referring now to the drawings, there is illustrated in FIG. 1 a portion of a first embodiment of a vehicle disc brake assembly, indicated generally at 10, including a pad retraction spring, indicated generally at 30, in accordance with the present invention. The general structure and operation of the vehicle disc brake assembly 10 is conventional in the art. Thus, only those portions of the vehicle disc brake assembly 10 which are necessary for a full understanding of this invention will be explained and illustrated. Although this invention will be described and illustrated in conjunction with the particular vehicle disc brake assembly disclosed herein, it will be appreciated that this invention may be used in conjunction with other vehicle disc brake assemblies.

The vehicle disc brake assembly 10 includes an anchor or adapter bracket 12 which is adapted to be secured to a fixed, non-rotatable component of the vehicle. Such a fixed, non-rotatable vehicle component can be, for example, an axle flange (not shown), when the disc brake assembly 10 is installed for use on the rear of the vehicle, or a steering knuckle (not shown), when the disc brake assembly 10 is installed for use on the front of the vehicle. To accomplish this, the anchor bracket 12 is provided with a pair of threaded apertures (not shown), formed therethrough. A pair of threaded bolts (not shown) extend through associated non-threaded apertures (not shown) provided in the non-rotatable vehicle component and are threadably received in the threaded apertures of the anchor bracket 12. In the illustrated embodiment, the anchor bracket 12 further includes a pair of blind holes (not shown) which as will be discussed below, are adapted to receive associated slide pins to slidably support a brake caliper (not shown) relative thereto.

Figure 4:
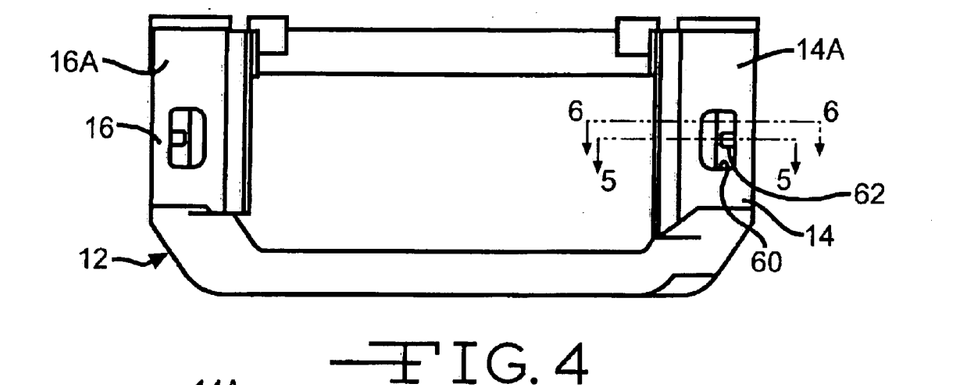
FIG. 4 is a view of a portion of the brake assembly illustrated in FIG. 1.
Figure 5:
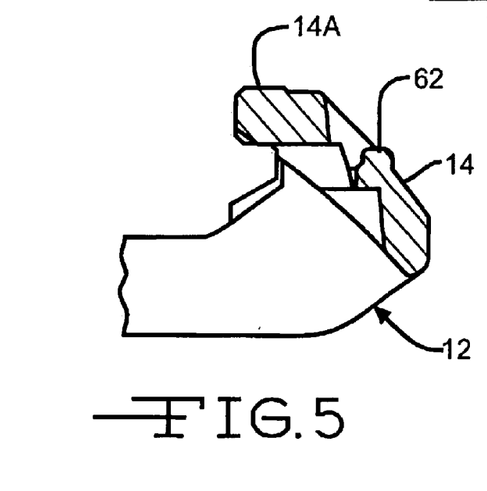
FIG. 5 is a sectional view taken along line 5—5 of FIG. 4.
Figure 6:
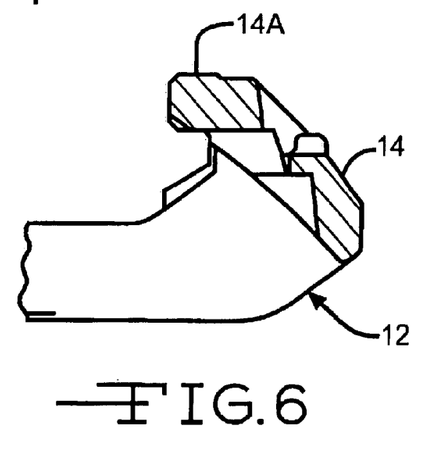
FIG. 6 is a sectional view taken along line 6—6 of FIG. 4.

The anchor bracket 12 includes a pair of outwardly extending arms 14 and 16, shown in FIG. 4. The arms 14 have respective upstanding guide rails 14A and 16A formed thereon. The guide rails 14A and 16A extend transverse to the arms 14 and 16, respectively, and extend parallel to one another. A pair of brake shoes 18 and 20 are supported on the guide rails 14A and 16A of the anchor bracket 12 for sliding movement relative thereto.

The inboard brake shoe 18 includes a backing plate 18A having a friction pad 18B secured thereto. Similarly, the outboard brake shoe 20 includes a backing plate 20A having a friction pad 20B secured thereto. The brake shoes 18 and 20 are disposed on opposite sides of a brake rotor (not shown). The brake rotor is generally flat and circular in shape and is secured in a conventional manner to a rotatable wheel (not shown) of the vehicle. To effect braking action of the associated vehicle wheel, means are provided for selectively moving the brake shoes 18 and 20 inwardly toward one another so as to frictionally engage the opposed sides of the brake rotor 22. Such means is conventional and includes a disc brake caliper assembly (not shown). The disc brake caliper assembly and the operation of the pad retraction springs 30 of the present invention can be similar to that disclosed in U.S. Pat. No. 6,378,665 to McCormick et al., the disclosure of this patent incorporated herein by reference. As disclosed in the McCormick et al. patent, the disc brake caliper assembly includes a brake caliper which is supported on a pair of slide pins for sliding movement relative to the anchor bracket. The slide pins permit the brake caliper to slide in both the outboard direction and the inboard direction when the disc brake assembly is actuated, as described therein.

The disc brake assembly 10 further includes a pad retraction mechanism which is operative to apply a force to urge the brake shoes 18 and 20 apart from one another to prevent engagement with the rotor 22 when the brake pedal is released. The retraction mechanism preferably includes a pair of retractor springs 30 which are disposed on opposite sides of the brake caliper and in particular, which are disposed on the arms 14 and 16 of the anchor bracket 12. In the illustrated embodiment, the retractor springs 30 are identical in structure and operation, although such is not required. Each pad retraction spring 30 is preferably formed from a round band of stainless steel. More preferably, the pad retraction spring 30 is formed from about 1.5 mm to about 2 mm stainless steel. However, other materials, such as for example, plastics and other metals, and other forms, such as for example, plate springs, wire with square and rectangular cross sections, can be used.

Figure 2:
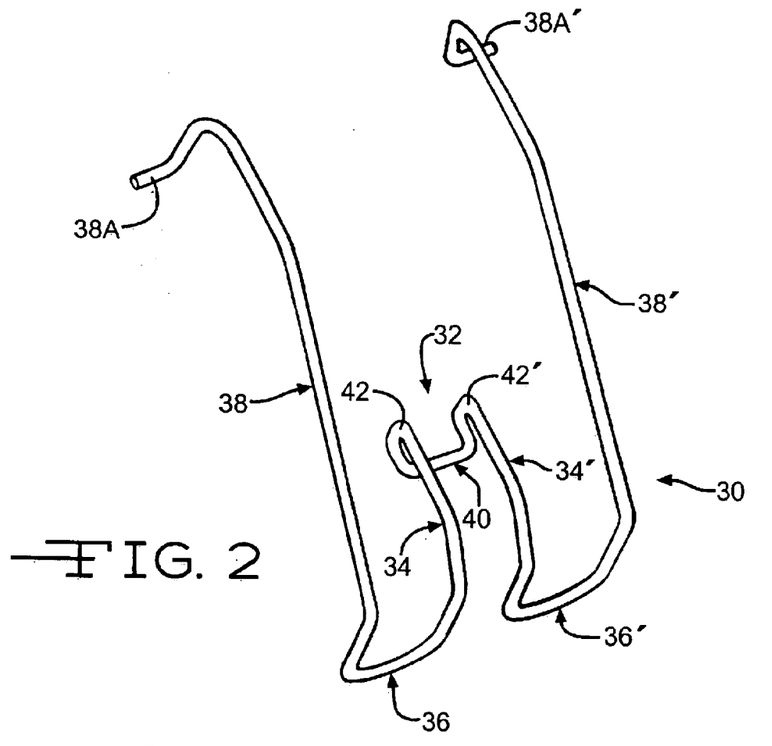
FIG. 2 is a perspective view of the pad retraction spring illustrated in FIG. 1, the pad retraction spring being shown in the installed loaded position.
Figure 3:
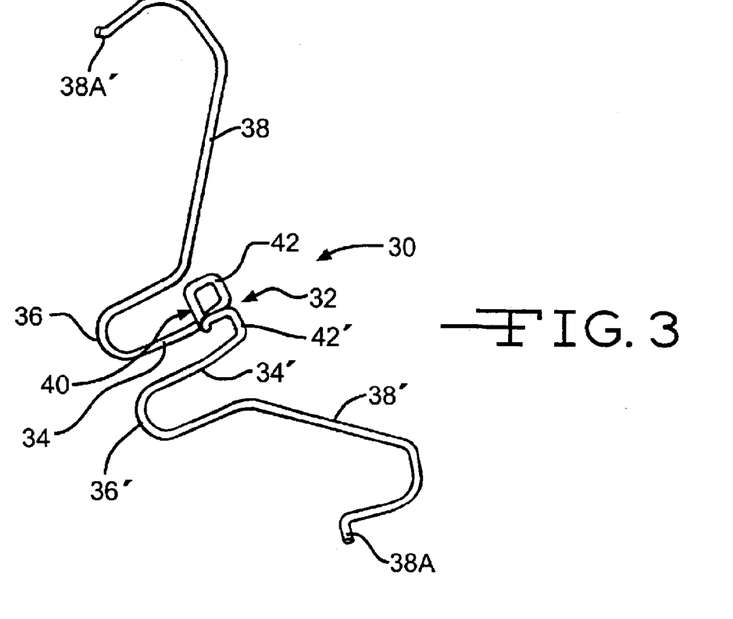
FIG. 3 is another view of the pad retraction spring illustrated in FIGS. 1 and 2, the pad retraction spring being shown in the uninstalled preloaded position.

In the illustrated embodiment, each of the retractor springs 30 is formed having a central mounting portion, indicated generally at 32, a first pair of spring arms 34 and 34', a second pair of spring arms 36 and 36', and a third pair of spring arms 38 and 38'. As best shown in FIG. 2, the central mounting portion 32 includes a generally U-shaped central mounting portion 40. The central mounting portion 32 is connected to the first pair of spring arms 34 and 34' by generally reversely bent back portions 42 and 42' respectively. The spring arms 38 and 38' terminate at respective outwardly extending portions 38A and 38A'. The ends of the portions 38A and 38A' define attachment fingers of the spring 32. As shown in FIG. 1, the attachment finger 38A of the arm 38 of the pad retraction spring 30 is disposed in an aperture (not shown) formed in the backing plate 18A of the inboard brake shoe 18, and the attachment finger 38A' of the arms 38' of the pad retraction spring 30 is disposed in an aperture (not shown) formed the backing plate 20A of the outboard brake shoe 20.

Figure 8:
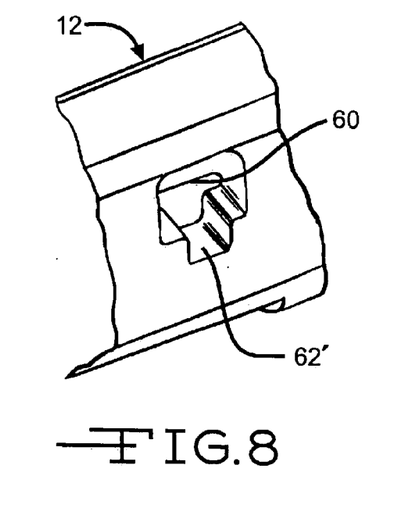
FIG. 8 a view of a portion of a second embodiment of a brake assembly in accordance with the present invention.
Figure 9:
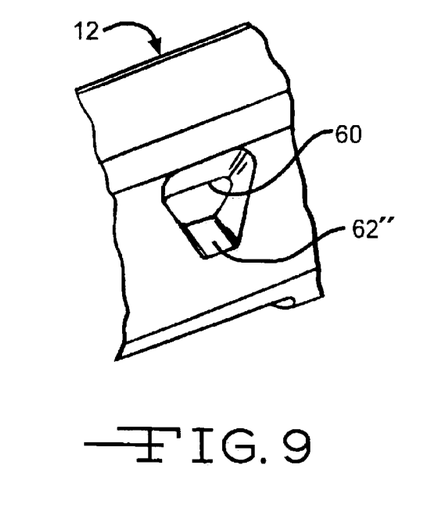
FIG. 9 a view of a portion of a third embodiment of a brake assembly in accordance with the present invention.

In the illustrated embodiment, the springs 30 are respectively supported on and secured to the arms 14 and 16 of the anchor bracket 12. To accomplish this, an opening or window 60 is provided on each of the arms 14 and 16 in a predetermined position located relative to the position of the associated brake rotor. The opening 60 is provided with an upstanding mounting lug or protuberance 62 provided thereon. The mounting lug 62 is sized to receive the arms 34 and 34' of the spring 50 so as to locate the spring 50 on the anchor bracket 12 in a predetermined position and prevent the lateral movement thereof. Alternatively, the structure of the opening 60 can be other than illustrated if so desired. For example, as shown in FIG. 8, the opening 60 can have a mounting notch or recess 62' provided therein, and as shown in FIG. 9, the opening 60 can have a necked down narrow mounting portion 62". In both of these alternate embodiments, the mounting notch 62' and the narrow mounting portion 62" are sized to receive the arms 34 and 34' of the spring 50 so as to locate the spring 50 on the anchor bracket 12 in a predetermined position and to prevent lateral movement thereof.

Figure 7:
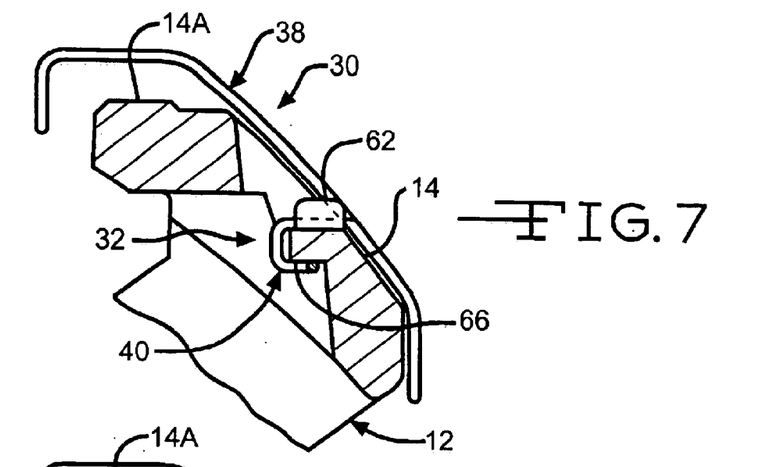
FIG. 7 is a partial sectional view of a portion of the first embodiment of the brake assembly and pad retraction spring illustrated in FIG. 1.
Figure 10:
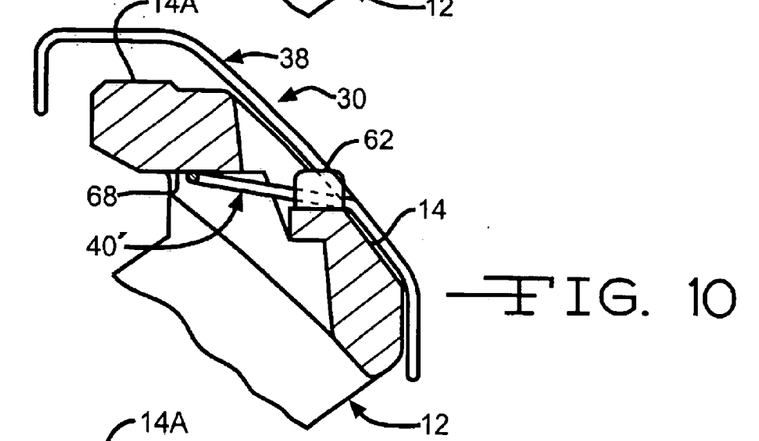
FIG. 10 is a partial sectional view of a portion of a fourth embodiment of a brake assembly and pad retraction spring in accordance with the present invention.
Figure 11:
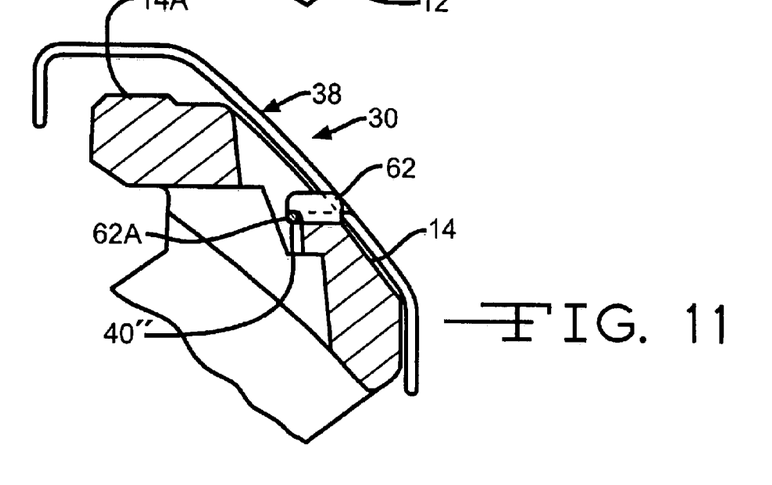
FIG. 11 is a partial sectional view of a portion of a fourth embodiment of a brake assembly and pad retraction spring in accordance with the present invention.

Also, as best shown in FIG. 7, the central mounting portion 40 is hooked over and secured adjacent a surface 66 of the anchor bracket 12. Preferably, to accomplish this, the distance between central mounting portion 40 and the arms 34 and 34' is slightly less than the dimension of the portion 66 of the anchor bracket 12 so that a biasing spring force is provided to assist in securing and retaining the central mounting portion 40 retained on the anchor bracket portion 66. Alternatively, the structure of the central mounting portion 40 of the pad retraction spring 30 and/or the opening 60 can be other than illustrated if so desired. For example, as shown in FIG. 10, the pad retraction spring 30 could have a central mounting portion 40' which extends in the direction shown to enable the central mounting portion 40' to be located under and biased against a surface 68 of the anchor bracket 12. Also, as shown in FIG. 11, the mounting lug 62 can provided with a recess 62A and the pad retraction spring 30 can include a central mounting portion 40" which is positioned or "hooked" into the recess 62A.

As shown in FIG. 1, when the springs 30 are installed on the disc brake assembly 10 each of the springs 30 engages and applies forces to both the inboard brake shoe 18 and the outboard brake shoe 20 to urge them apart from one another to prevent engagement with the brake rotor. Preferably, the pad retraction springs 30 are operative to evenly divide the amount of piston roll back in order to maintain a predetermined clearance between the brake shoes 18 and 20 and the associated braking surfaces of the brake rotor when pressure to the disc brake assembly 10 is released. Alternatively, the springs 30 can be configured so as to provide a different force to each of the brake shoes 18 and 20 if so desired. Also, the forces exerted by the pad retraction springs 30 are preferably not sufficient to overcome the roll-back seal of the disc brake assembly to move the associated brake piston deeper within a piston recess formed in the brake caliper. Alternatively, as will be discussed below, the structure of the opening 60 and/or the pad retraction spring 30 can be other than illustrated if so desired.

Figure 12:
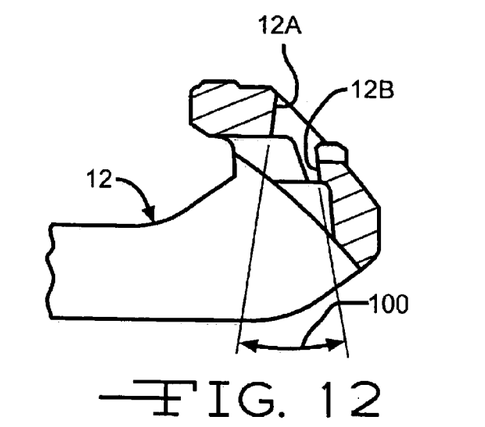
FIG. 12 is a partial sectional view of a portion of a brake assembly showing a first embodiment of a drafting arrangement in accordance with the present invention.
Figure 13:
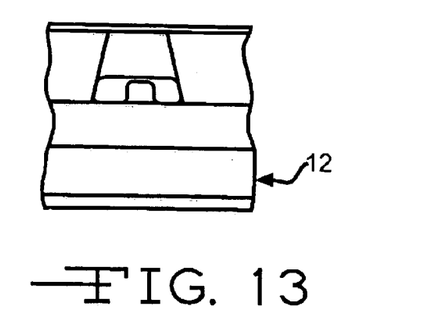
FIG. 13 is another view of the first embodiment of the drafting arrangement illustrated in FIG. 12.
Figure 14:
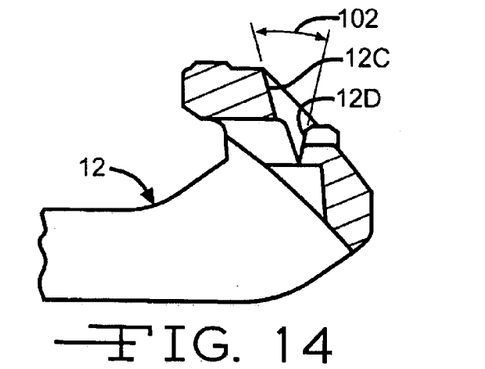
FIG. 14 is a partial sectional view of a portion of a brake assembly showing a second embodiment of a drafting arrangement in accordance with the present invention.
Figure 15:
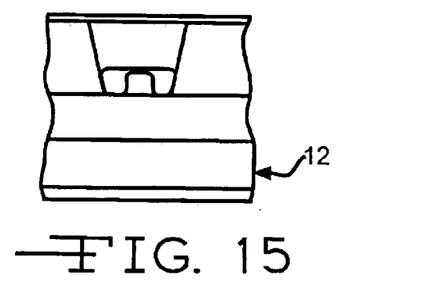
FIG. 15 is another view of the second embodiment of the drafting arrangement illustrated in FIG. 14.
Figure 16:
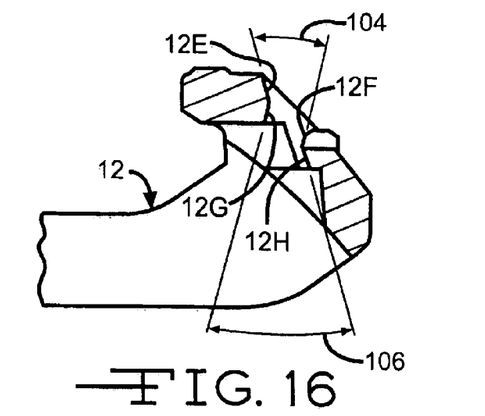
FIG. 16 is a partial sectional view of a portion of a brake assembly showing a third embodiment of a drafting arrangement in accordance with the present invention.
Figure 17:
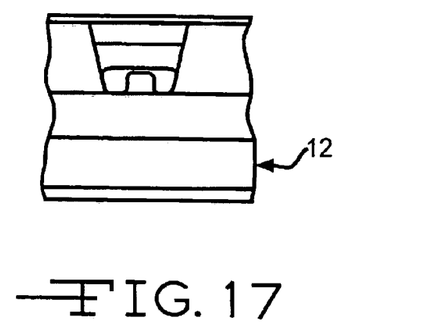
FIG. 17 is another view of the third embodiment of the drafting arrangement illustrated in FIG. 16.

Turning now to FIGS. 12–17, three embodiments for the draft on the anchor bracket 12 of the present invention will be discussed. The first embodiment is shown in FIGS. 12 and 13 and illustrates a "lower" drafting configuration of the anchor bracket. As shown therein, in this embodiment the drafting of the anchor bracket 12 occurs between a pair of surfaces 12A and 12B of the anchor bracket 12 and defines a draft angle 100. The second embodiment is shown in FIGS. 14 and 15 and illustrates an "upper" drafting configuration of the anchor bracket. As shown therein, in this embodiment the drafting of the anchor bracket 12 occurs between a pair of surfaces 12C and 12D of the anchor bracket 12 and defines a draft angle 102. A third and final embodiment is shown in FIGS. 16 and 17 and illustrates a mid-drafting configuration of the anchor bracket. As shown therein, in this embodiment the drafting of the anchor bracket 12 occurs between a first pair of surfaces 12E and 12F and a second pair of surfaces 12G and 12H of the anchor bracket 12. The first pair of surfaces 12E and 12F define a draft angle 104, and the second pair of surfaces 12G and 12H define a draft angle 106.

Preferably, the pad retraction springs 30 of the present invention are operative to evenly divide the amount of piston roll back in order to maintain a predetermined clearance (such as shown in prior art FIG. 18 by reference character X), between the brake shoes 18 and 20 and the associated braking surfaces of the brake rotor when pressure to the disc brake assembly 10 is subsequently released. Also, the forces exerted by the pad retraction springs 30 of the present invention are preferably not sufficient to overcome the roll-back seal to move the brake piston deeper within the cylindrical recess formed in the inboard leg of the brake caliper assembly. Alternatively, the springs 30 can be configured so as to provide a different force to each of the brake shoes 18 and 20 if so desired.

The pad retraction springs 30 preferably have a predetermined spring rate which is in the range from about 0.40 N/mm to about 0.70 N/mm. More preferably, the pad retraction springs 30 can have a spring rate of about 0.55 N/mm. Thus, in a vehicle application having a pair of pad retraction springs 30 having a spring rate of 0.55 N/mm, the springs 30 are operative to apply a force of about 11.8 newtons against the opposed ends of the brake shoes 18 and 20 when the pads 18B and 20B are new. As the pads 18B and 20B wear thinner (around 12 mm of total wear for each pad 18B and 20B), the springs 30 are operative to apply a force of about 18.4 newtons against the opposed ends of the brake shoes 18 and 20. Another example is a pad retraction spring 30 having a spring rate of 0.55 N/mm is operative to apply a force of about 13.6 newtons against the opposed ends of the brake shoes 18 and 20 when the pads 18B and 20B are new and as the pads 18B and 20B wear thinner (around 12 mm of total wear for each pad 18B and 20B), the springs 30 are operative to apply a force of about 20.2 newtons against the opposed ends of the brake shoes 18 and 20. Alternatively, the spring rate of the pad retraction springs 30 can be other than described above if so desired. It should be noted that the force of the springs 30 is preferably lower than a force that would overcome the roll back seal and move the brake piston within the recess. Such a force necessary to overcome the roll back seal would be around generally be at least around 100 newtons or greater. In addition, the force of the springs 30 is preferably not sufficient by itself to move the brake shoes 18 and 20 apart from one another to prevent engagement with the brake rotor when the brake pedal is released. However, the springs 30 in combination with the movement of the vehicle and/or other brake components is effective to allow the springs 30 to bias the shoes 18 and 20 apart from one another to prevent engagement with the brake rotor. However, in a brake application having a low sliding resistance of the brake shoes 18 and 20 on the associated guide rails 14 and 16 and depending upon the particular configuration of the springs 30, the springs 30 by themselves could apply a force sufficient to bias the shoes 18 and 20 apart from one another from engagement with the brake rotor when the brake pedal is released. Also, in accordance with this invention, the spring force exerted solely by the springs 30 can be effective to move only one of the brake shoes, for example, the inboard brake shoe 18 away from engagement with the brake rotor since this does not require the need to move the brake caliper; however, the spring force exerted solely by the springs 30 would not be effective to move the other one of the brake shoes, such as for example, the outboard brake shoe 20 away from engagement with the rotor 22 since this requires movement of the brake caliper. Thus, in accordance with this invention, even after substantial wear of the friction pads 18B and 20B has occurred and the pad retraction springs 30 apply an increasing force, the pad retraction springs 30 exert a relatively low force against the brake shoes 18 and 20. As a result, the forces exerted by the pad retraction springs 30 remain sufficient to move the brake shoes 18 and 20 apart from one another from engagement with the rotor by the predetermined clearance, but insufficient to overcome the roll-back seal to move the brake piston deeper within the cylindrical recess formed in the inboard leg of the brake caliper.

One advantage of the present invention is that the pad retraction spring 30 is fixed to the bracket 12 in a manner that prevents lateral movement thereof. In the illustrated embodiments, this is accomplished by the opening 60 having the mounting lug 62 in FIG. 1, the mounting notch 62' in FIG. 8, and the necked down narrow mounting portion 62" in FIG. 9. As a result, the pad retraction spring 30 is retained in a mounting/locating feature that is easily manufactured with common casting techniques without the use of a core. Also, the size of the opening 60 for the pad retraction spring 30 is large enough sized to allow trim dies, punches, or other equipment to pass through. As a result, the opening 60 can be kept clear of excess flash and sand as part of the normal production sequence with possibly only minor tooling modifications.

In accordance with the provisions of the patent statues, the principle and mode of operation of this invention have been described and illustrated in its preferred embodiments. However, it must be understood that the invention may be practiced otherwise than as specifically explained and illustrated without departing from the scope or spirit of the attached claims.

What is claimed is:

1. A disc brake assembly comprising:

an anchor bracket adapted to be secured to a vehicle component, said anchor bracket including a pair of outwardly extending arms, each of said arms having an outer surface and an inner surface which defines an arm thickness, at least one of said arms having an opening formed completely through said arm thickness from said outer surface to said inner surface;

a brake caliper adapted to be secured to said anchor bracket;

a pair of brake shoes carried by said disc brake assembly and adapted to be disposed on opposite axial sides of an associated brake rotor;

actuation means for selectively moving said pair of brake shoes into frictional engagement with the rotor; and at least one pad retraction spring carried by said disc brake assembly for moving said pair of brake shoes from engagement with the rotor when said pair of brake shoes are in a non-braking position, said pad retraction spring including a central mounting portion and a pair of outermost spring arms, said central mounting portion extending through said opening of said at least one of said arms and engaging a portion of said anchor bracket adjacent said opening to thereby secure and locate said pad retraction spring on said anchor bracket in a predetermined position, said outermost spring arms engaging a portion of said pair of brake shoes.

2. The disc brake assembly according to claim 1 wherein said opening is integrally cast with said anchor bracket.

3. The disc brake assembly according to claim 1 wherein said opening includes an upstanding mounting lug provided thereon to thereby locate said pad retraction spring on said anchor bracket in a predetermined position.

4. The disc brake assembly according to claim 1 wherein said opening includes a mounting notch provided therein to thereby locate said pad retraction spring on said anchor bracket in a predetermined position.

5. The disc brake assembly according to claim 1 wherein said opening includes a necked down narrow mounting portion to thereby locate said pad retraction spring on said anchor bracket in a predetermined position.

6. The disc brake assembly according to claim 1 wherein said central mounting portion is generally U-shaped and includes a pair of reversely bent back spring arms, said central mounting portion being hooked over a portion of said anchor bracket adjacent said opening and engaging an adjacent surface of said anchor bracket to thereby secure said pad retraction spring to said anchor bracket.

7. The disc brake assembly according to claim 1 wherein said central mounting portion is located under and biased against a surface of said anchor bracket located radially outwardly from said opening to thereby secure said pad retraction spring to said anchor bracket.

8. The disc brake assembly according to claim 1 wherein said opening includes an upstanding mounting lug provided thereon to thereby locate said pad retraction spring on said anchor bracket in a predetermined position, said lug provided with a recess, and wherein said central mounting portion is disposed in said recess of said mounting lug to thereby secure said pad retraction spring to said anchor bracket.

9. The disc brake assembly according to claim 1 wherein said outermost spring arms of said pad retraction spring are disposed in apertures formed in said pair of brake shoes.

10. A disc brake assembly comprising:

an anchor bracket adapted to be secured to a vehicle component, said anchor bracket including a pair of outwardly extending arms, each of said arms having an outer surface and an inner surface which defines an arm thickness, each of said arms having an opening formed completely through said arm thickness from said outer surface to said inner surface;

a brake caliper adapted to be secured to said anchor bracket;

a pair of brake shoes carried by said disc brake assembly and adapted to be disposed on opposite axial sides of an associated brake rotor;

actuation means for selectively moving said pair of brake shoes into frictional engagement with the rotor; and a pair of pad retraction springs carried by said disc brake assembly for moving said pair of brake shoes from engagement with the rotor when said pair of brake shoes are in a non-braking position, each of said pad retraction springs including a central mounting portion and a pair of outermost spring arms, said central mounting portion extending through said opening of a respective one of said arms and engaging a portion of said anchor bracket adjacent said opening to thereby secure and locate said pad retraction spring on said anchor bracket in a predetermined position, said outermost spring arms engaging a portion of said pair of brake shoes.

11. The disc brake assembly according to claim 10 wherein said opening is integrally cast with said anchor bracket.

12. The disc brake assembly according to claim 10 wherein said opening includes an upstanding mounting lug provided thereon to thereby locate said pad retraction spring on said anchor bracket in a predetermined position.

13. The disc brake assembly according to claim 10 wherein said opening includes a mounting notch provided therein to thereby locate said pad retraction spring on said anchor bracket in a predetermined position.

14. The disc brake assembly according to claim 10 wherein said opening includes a necked down narrow mounting portion to thereby locate said pad retraction spring on said anchor bracket in a predetermined position.

15. The disc brake assembly according to claim 10 wherein said central mounting portion is generally U-shaped and includes a pair of reversely bent back spring arms, said central mounting portion being hooked over a portion of said anchor bracket adjacent said opening and engaging an adjacent surface of said anchor bracket to thereby secure said pad retraction spring to said anchor bracket.

16. The disc brake assembly according to claim 10 wherein said central mounting portion is located under and biased against a surface of said anchor bracket located radially outwardly from said opening to thereby secure said pad retraction spring to said anchor bracket.

17. The disc brake assembly according to claim 10 wherein said opening includes an upstanding mounting lug provided thereon to thereby locate said pad retraction spring on said anchor bracket in a predetermined position, said lug provided with a recess, and wherein said central mounting portion is disposed in said recess of said mounting lug to thereby secure said pad retraction spring to said anchor bracket.

18. The disc brake assembly according to claim 10 wherein said outermost spring arms of said pad retraction spring are disposed in apertures formed in said pair of brake shoes.

19. A disc brake assembly comprising:

an anchor bracket adapted to be secured to a vehicle component, said anchor bracket including a pair of outwardly extending arms, each of said arms having an outer surface and an inner surface which defines an arm thickness, at least one of said arms having an opening formed completely the through said arm thickness from said outer surface to said inner surface, said opening including an upstanding mounting lug provided thereon;

a brake caliper adapted to be secured to said anchor bracket;

a pair of brake shoes carried by said disc brake assembly and adapted to be disposed on opposite axial sides of an associated brake rotor;

actuation means for selectively moving said pair of brake shoes into frictional engagement with the rotor; and at least one pad retraction spring carried by said disc brake assembly for moving said pair of brake shoes from engagement with the rotor when said pair of brake shoes are in a non-braking position, said pad retraction spring including a central mounting portion and a pair of outermost spring arms, said central mounting portion of pad retraction spring being generally U-shaped and including a pair of reversely bent back spring arms, said central mounting portion extending through said opening of said at least one of said arms and being hooked over a portion of said anchor bracket adjacent said opening and engaging an adjacent surface of said anchor bracket to thereby secure and locate said pad retraction spring on said anchor bracket in a predetermined position, said outermost spring arms engaging a portion of said pair of brake shoes.

20. The disc brake assembly according to claim 19 wherein said opening and said upstanding mounting lug are integrally cast with said anchor bracket.

* * * * *